(12) United States Patent
Bushuev (10) Patent No.: US 7,232,937 B2
(45) Date of Patent: Jun. 19, 2007

(54) PROCESS FOR PRODUCING LOW-MOLECULAR OLEFINS BY PYROLYSIS OF HYDROCARBONS

(75) Inventor: Vladimir Andreevich Bushuev, Moscow (RU)

(73) Assignee: Coolbrook Limited, Tortola (VG)

( * ) Notice: Subject to any disclaimer, the term of this patent is extended or adjusted under 35 U.S.C. 154(b) by 457 days.

(21) Appl. No.: 10/884,112

(22) Filed: Jul. 1, 2004

(65) Prior Publication Data

US 2005/0137440 A1 Jun. 23, 2005

Related U.S. Application Data

(63) Continuation of application No. 09/649,431, filed on Aug. 25, 2000, now abandoned.

(30) Foreign Application Priority Data

Feb. 11, 1999 (WO) .................... PCT/RU99/00038
Feb. 27, 1999 (RU) ................................. 98104821

(51) Int. Cl.
C07C 4/04 (2006.01)
(52) U.S. Cl. ...................................... 585/648; 585/652
(58) Field of Classification Search ............... 585/648, 585/652
See application file for complete search history.

(56) References Cited

U.S. PATENT DOCUMENTS 4,265,732 A * 5/1981 Dinulescu .................... 208/106

* cited by examiner

*Primary Examiner*—Thuan Dinh Dang
(74) *Attorney, Agent, or Firm*—Peter J. Phillips; Cooper & Dunham LLP (57) ABSTRACT

Process for producing low-molecular olefins by pyrolysis of hydrocarbons comprising mixing of feedstock with steam-diluent, preheating the resulting mixture, rapid heating the said mixture up to pyrolysis temperature and maintaining this temperature inside reactor during residence time, quenching product stream and subsequent fractionation of products. The reactor has an annular work cavity where stationary blades and rotatable work blades are located. A ring vortex flow is created and maintained in the work cavity when the work blades are rotated. A heat needed for pyrolysis is generated due to hydrodynamic drag of rotated work blades. Heating the mixture up to pyrolysis temperature is performed by mixing with hot process stream recirculated in the work cavity for a negligible time in comparison with the residence time. The process enables increase of the low-molecular olefins yield.

2 Claims, 5 Drawing Sheets

PROCESS FOR PRODUCING LOW-MOLECULAR OLEFINS BY PYROLYSIS OF HYDROCARBONS

CROSS-REFERENCE TO RELATED APPLICATIONS

This application is a continuation of Ser. No. 09/649,431 filed Aug. 25, 2000 now abandoned.

FIELD OF THE INVENTION

The invention relates to the petrochemical industry specifically to the production of low-molecular olefins by thermal cracking (pyrolysis) of hydrocarbons.

BACKGROUND OF THE INVENTION

At present a thermal pyrolysis of hydrocarbons is the basic process of commercial production of low-molecular olefins—ethylene and propylene. As a feedstock there are used hydrocarbons which molecule has two or more atoms of carbon. In industry there are generally used gases of petroleum refining, as well as naphtha and gas oil fractions.

In generally accepted technology a feedstock mixed with steam and preheated, is supplied into a cracking tube located inside radiant section of pyrolysis furnace, wherein the mixture is rapidly heated. Pyrolysis reactions proceed with large absorption of heat. A product stream having the outlet temperature 750–950° C. is quenched and transported into a gas fractionating installation, in which ethylene, propylene, butadiene, methane, hydrogen and other pyrolysis products are separated. Ethylene is the most valuable product of pyrolysis.

Among reactions of thermal pyrolysis there can be distinguished: the primary reactions resulting in formation of olefins and the secondary ones, during which formed olefins are wasted. With temperature increase these reactions are accelerated, both primary and secondary, but the rate of primary reactions increases quicker than the rate of secondary ones. The rate of primary reactions does not depend on pressure, whereas the rate of secondary reactions decreases with pressure decrease. Therefore, to increase the olefin yields there is a need to decrease hydrocarbon partial pressure in the work cavity and increase the process temperature within said limits. The hydrocarbon partial pressure can be decreased by adding a steam-diluent. An optimal amount of steam-diluent depends on the composition of the hydrocarbon feed. For light feedstock—ethane or propane—the amount of steam usually is 20–40% of feedstock mass. For heavy feedstock, such as gas oils, the amount of a steam can be 80–100% of feedstock mass. It is undesirable to increase the pyrolysis temperature above 950–1000° C., because this accelerates sharply coke formation and causes increase in yield of less valuable acetylene yield at the expense of ethylene.

Essential component of pyrolysis plants is the means for quenching of product stream leaving reactor to the temperature of stopping undesirable secondary reactions. The quenching can be both direct—by injection of steam, water or light pyrolysis tar—and indirect—by using a heat exchanger. The direct quenching is usually applied in thermal cracking of gas oils. In thermal cracking of light hydrocarbons the indirect quenching in heat exchanger apparatus is usually applied generating simultaneously a high pressure steam.

During pyrolysis of hydrocarbons a pyrocarbon is always evolved, part of which in the form of soot particles is carried away by the product stream, but the another part forms coke deposits on the walls both of cracking tubes and downstream apparatuses as well. Coke deposits increase a pressure drop through cracking tubes and deteriorate a proper heat transfer into reaction zone, resulting in overheating the cracking tubes, decrease in productivity of pyrolysis plant and decrease in yields of low-molecular olefins. Therefore coke deposits are periodically removed, usually this is performed by burning out with air or air-steam mixture.

Following disadvantages of hydrocarbon pyrolysis in tubular furnaces is noteworthy:

a. it is necessary to transfer a large amount of heat into the reaction zone through the cracking tube walls. Because of large heat flows the temperature of the cracking tube wall much exceeds the temperature of a process stream causing an intensive coke formation and decrease in desired products yield. It is impossible to decrease the pressure in the zone of pyrolysis because of the necessity to provide a high rate of feedstock flow through this zone required by conditions of heat transfer;

b. the rate of feedstock heating through the cracking tube is insufficient. So an initial amount of desired olefins formed at relatively low temperatures and carried further by feedstock flow through more and more intensively heated zones resides an excess time under conditions, when secondary reactions proceed with grate intensity. This disadvantage becomes greatly evident in pyrolysis of wide petroleum fractions, such as naphtha or gas oil, which contain both easy cracked high-molecular hydrocarbons and low-molecular hydrocarbons cracked under higher temperatures.

To eliminate said disadvantages, the processes for producing olefins by the thermal decomposition of hydrocarbons were offered, in which heat is not transferred into the reaction zone through boundary of this zone.

U.S. Pat. No. 5,300,216 discloses method and apparatus for thermal cracking hydrocarbons in the presence of steam by passing through stationary shock wave of high intensity. A steam superheated in a tubular heater to a temperature of about 1000° C. is introduced at a pressure of about 2.7 MPa through a supersonic nozzle into a reactor comprising series-positioned mixing and pyrolysis zones. In the mixing zone the hydrocarbon feed—ethane—preheated to the temperature of about 627° C. is introduced through mixers into supersonic flow of steam. The resulting mixture forms a supersonic process stream, which has a temperature lower than that required to initiate pyrolysis reactions. Between the said mixing and pyrolysis zones a straight compression shock—continuous-standing shock wave—is created. In this compression shock a kinetic energy of the supersonic process stream is converted into the heat. Immediately downstream of the compression shock the velocity of the process stream falls to subsonic level, and the temperature rises up to about 1000° C. at a pressure of about 0.9 MPa abs. The process stream passes the pyrolysis zone for 0.005–0.05 sec. while its temperature decreases to about 863° C. at the expense of heat absorbed by pyrolysis reactions. Conversion of ethane into ethylene achieves 70%. The product stream passes quenching apparatus and downstream heat exchangers, and further is transported to gas fractionation. In this apparatus all said above disadvantages of tubular pyrolysis reactors are eliminated. The feedstock reaches maximum pyrolysis temperature especially rapidly, and the boundary of the pyrolysis section are not used for transfer of heat into reaction zone. But at the same time the required amount of steam per hydrocarbon mass must be about 500–667%.

Because of this the energy expenses per unit of produced ethylene are excessively high and can not be essentially decreased. Thus this apparatus noncompetitive at current interrelation of energy costs with olefin costs.

U.S. Pat. No. 5,597,537 discloses a process for fluidized catalytic cracking of hydrocarbon feed stream. This process comprises contacting the hydrocarbon feed stream with a dust catalyst at an initial temperature 664° C. in a riser. Heat required for the cracking is transferred to process stream from particles of catalyst, and temperature of the catalyst decreases to 532° C. Then hydrocarbon products are separated from a coked catalyst, and coked catalyst passes to a regenerator. Here the coke from said catalyst is combusted by hot air to produce regenerated catalyst, and catalyst temperature increases. Regenerated catalyst passes into riser again. In this apparatus a heat is not transferred into reaction zone through boundary of this zone.

Unfortunately, high severity of destruction process, typical for pyrolysis of hydrocarbons in tubular furnaces, in this apparatus is impossible. This is a cause on which the best yield of ethylene in this apparatus does not exceed 5 . . . 7%, and so this apparatus is not used for commercial producing of ethylene.

U.S. Pat. No. 4,265,732 discloses a process for thermal cracking gaseous hydrocarbon feed, wherein the heal required for pyrolysis is generated directly in a process stream due to hydrodynamic drag of the rotated blades. Pyrolysis takes place in a reactor designed as a multistage blade machine of axial type containing alternating rotating blade rows and stationary blade rows positioned in series. Desired profiles of a pressure and temperature along the reactor length are reached by properly profiling of these blades. The reactor boundary is not used for transfer of heat into the reaction zone.

This invention eliminates completely the disadvantage (a), but the disadvantage (b) is not eliminated. An axial type multistage blade apparatus is needed to realize this process. This apparatus have to be capable of work at very high temperatures (up to 1050° C.) and comprise a great number of stages (up to 43). Difficulties appearing in development of this apparatus are so heavy that such apparatus has not been fabricated.

Thus all known methods of low-molecular olefins production by thermal pyrolysis of hydrocarbons when a heat is not transferred into zone of reaction through boundary of this zone are not suitable for commercial using.

Thereby, attempts to develop a method of pyrolysis of hydrocarbons free of disadvantages (a) and (b) were not successful and at present the thermal pyrolysis of hydrocarbons in tubular furnaces is a single commercial method of the ethylene production.

In prior art there are known and widely used hydrodynamic devices, in which a torque is transferred from rotating shaft to stationary housing by ring vortex of medium filling work cavity. In these devices mechanical energy is converted into heat that is generated directly inside work medium and heats it. Such hydrodynamic devices having small overall dimension can transfer a maximum torque and absorb maximum power.

Here and hereinafter wording "ring vortex" means a vortex with the ring core, thereby, word "ring" pertains to the form of vortex core. Streamlines of such vortex are of the form of spirals convolute in ring.

U.S. Pat. No. 2,672,954 discloses hydrodynamic dynamometer. Housing and rotatable rotor located inside it form together two annular work cavities filled with liquid. In the work cavity the blades fixed on the rotor and directing blades fixed on the housing are located. Said cavities are formed and the said blades are configured and positioned so that in each cavity a ring vortex is created when the rotor is rotated. This ring vortex transfers a torque from rotor to housing of device. Cold work liquid is supplied into this device and hot one is withdrawn from the device through respective nipples communicated with work cavity.

U.S. Pat. No. 3,537,264 discloses hydrodynamic brake. Housing and rotatable rotor, which is located inside it, form together an annular work cavity filling with work fluid. This work cavity through respective channels is communicated with inlet and outlet nipples for transporting the work fluid. In the work cavity the rotor blades and stationary directing blades are located. The said cavity is formed and the said blades are configured and positioned so that a ring vortex is created when the rotor is rotated. This ring vortex transfers a torque from rotor to housing of device. The work fluid in this device is a liquid or gas (air, for example).

U.S. Pat. Nos. 4,864,872, 5,147,181, 5,571,975 disclose fluid torque transfer devices, which constructions are similar to the hydrodynamic brake covered by U.S. Pat. No. 3,537,264. The said devices and hydrodynamic brake on U.S. Pat. No. 3,537,264 differ in form and location of work and stationary blades.

SUMMARY OF THE INVENTION

The aim of the invention is creation of a process for producing low-molecular olefins by thermal pyrolysis of hydrocarbons.

In this process:

(I) a heat is not transferred into the reaction zone through boundary of this zone.

(II) a heating of hydrocarbon feed to pyrolysis temperature is performed for negligible time in comparison with the residence time.

(III) the amount of added steam-diluent per mass of hydrocarbon feedstock does not exceed the limits accepted in existing pyrolysis installations.

This aim is achieved in the process for producing low-molecular olefins by thermal pyrolysis of hydrocarbons comprising steps:

a) preparation of evaporated feedstock steam mixture, b) preheating the resulting mixture c) heating said mixture up to pyrolysis temperature, d) a supply with a heat, which is necessary for pyrolysis, into the process stream,   e) quenching a product stream, and   f) fractionation of the product stream, in this process in the step a) amount of added steam-diluent per mass of hydrocarbon feedstock does not exceed the limits accepted in existing pyrolysis plants.

steps c) and d) are performed in a reactor, comprising: a hollow housing having a nipple for inlet stream, and a nipple for outlet stream, and stationary blades:

a rotatable wheel with a work blades is positioned in said housing so that said wheel with said housing together form an annular work cavity, said cavity is formed so and said stationary blades and work blades are positioned in said cavity and are shaped to create a ring vortex flow in said cavity when said wheel is rotated, and said nipple for inlet stream and said nipple lot outlet stream are communicated with said work cavity.

step c) is performed by mixing of said mixture with hot process stream being circulated in said work cavity, for a negligible time in comparison with the residence time, step d) is performed using heat, generated directly in the process stream in result of hydrodynamic drag of said rotated work blades.

Reactor used in a process on the invention has annular work cavity in which stationary blades and blades of work wheel are located. When the work wheel is rotated a process stream circulates within this work cavity to create a ring vortex so that each particle of feedstock repeatedly passes through work blade row and stationary blade row. The heat needed for pyrolysis is generated directly inside the process stream as a result of a hydrodynamic drag of the rotated work blades. The work cavity boundary is not used for heat transfer into this cavity and a temperature of this boundary is close to temperature of the process stream.

A ring vortex flow in the work cavity provides transfer of maximum power to the process stream recirculated within this cavity, which can be achieved at given sizes and speed of rotation of work wheel. The ring vortex flow is used to achieve a high heat-generation per unit volume in the work cavity of a single-stage reactor, i.e. of the reactor having one work blade row and one stationary blade row in the work cavity. The single-stage design of the reactor gives a possibility of it fabrication by using existing materials and conventional gas-turbine technologies. A preheated inlet stream reaches pyrolysis temperature almost instantly due to mixing with hot process stream. By this way the aims (I) and (II) of the invention are achieved.

In the process on the invention, equally as in pyrolysis process in tubular furnaces, a steam-diluent is used for reduction of partial pressure of hydrocarbons in reaction zone, and pressure in work cavity of the reactor is lower than in a cracking tube of pyrolysis furnace. Consequently a steam-diluent content in the inlet stream needed for reduction of the hydrocarbons partial pressure down to the desired value will not be greater than in existing pyrolysis installations. By this way the aim (III) of the invention is achieved.

In the process on the invention, a heating of inlet stream up to pyrolysis temperature is perform by mixing it with hot process steam, which circulate in a reaction zone. That means, that reactor on the invention is reactor with the internal recirculation of process stream, which work process is close to work process of flow reactors of perfect mixing. Because of it the process fundamentally differs from all known processes of hydrocarbon pyrolysis, including the process on the U.S. Pat. No. 4,265,732 and processes realized in tubular pyrolysis furnaces. In comparison with the process on U.S. Pat. No. 4,265,732, the present process enables to increase in the low-molecular olefin yield. Opportunity to use a reactor of simpler design is the another advantage.

In accordance with a preferable aversion of the process on the invention a gas-turbine engine is used as a drive of said reactor, and step (b) is performed in two stages. The first stage of said preheating is carried out in first heat exchanger utilizing heat of exhaust gases of said gas-turbine engine. The second stage of said preheating is carried out in second heat exchanger utilizing heat of hot product stream outgoing from said reactor.

Using of gas-turbine engine as a drive of reactor is preferable because a heat of the exhaust gas can be effectively utilized for evaporation of inlet stream components in the first stage of preheating. But maximum temperature, which can be achieved at this stage, is limited by temperature of exhaust gas of a gas-turbine engine. By this reason a preheating of the inlet stream up to higher temperature is performed at second stage by utilizing a heat of hot product stream outgoing from the reactor, simultaneously the quenching of product stream is performed. The inlet stream preheating reduces energy consumption for process conducting.

DESCRIPTION OF THE PREFERRED EMBODIMENTS

The installation (FIG. 1) for realization of the process includes preheater 1, apparatuses 2 and 3 for quenching of product stream, reactor 4, gas-turbine engine 5 connected with reactor 4 by shaft 6, and with the preheater 1 by exhaust pipe 7.

Figure 1:
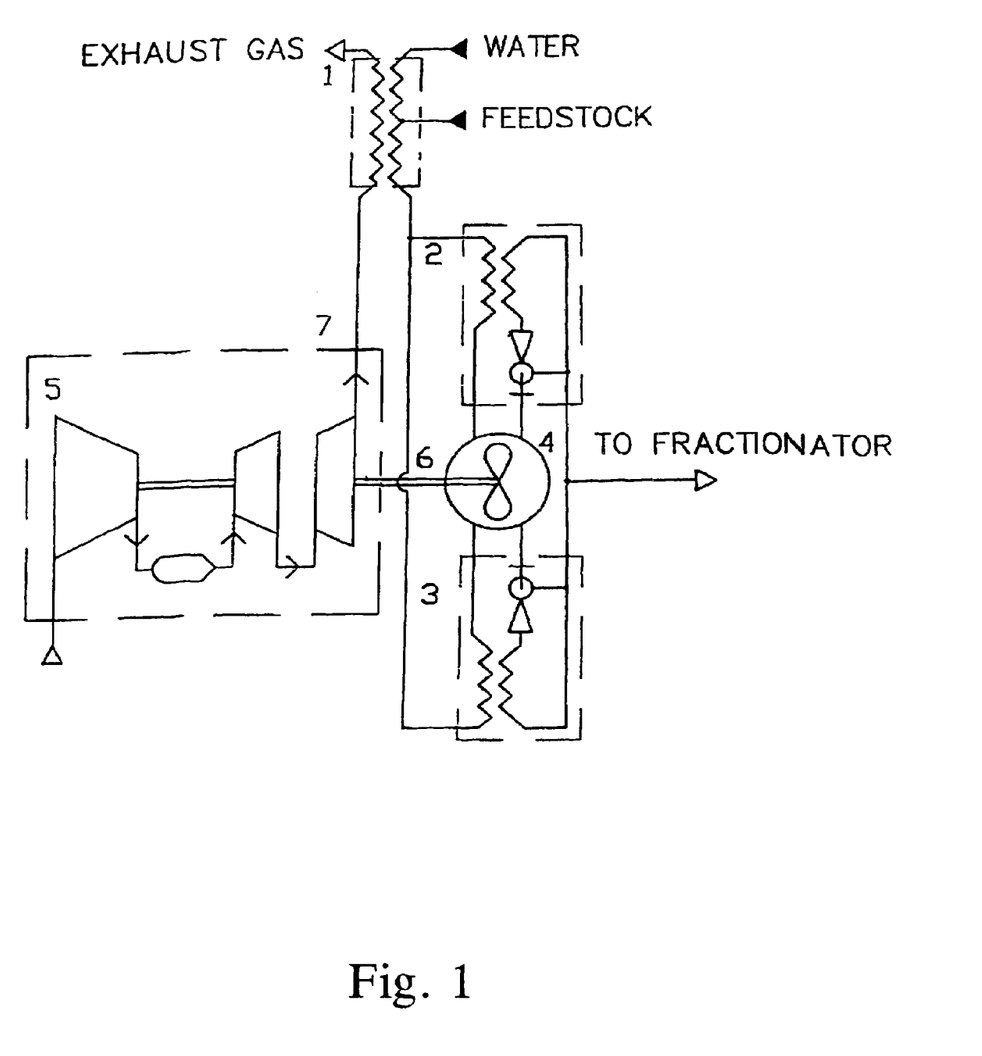
FIG. 1 is a schematic view of the installation for realization of the process for producing low-molecular olefins.

Preheating a feedstock and steam-diluent in the first stage is carried out in the preheater 1. The hydrocarbon feed form outside source (not shown in drawings) is conveyed by pressure into the preheater 1 configured as a shell-tube heat exchanger. The exhaust gas from the gas-turbine engine 5 is discharged into the intertubular space of this heat exchanger. From an outside source (not shown in drawings) water is conveyed by pressure into the preheater where the water it is evaporated, and resulting steam-diluent is mixed with the hydrocarbon feed.

Preheating a feedstock and steam-diluent in the second stage is carried out in the apparatuses 2 and 3 for quenching of product stream by utilization of heat of product stream leaving the reactor. Detailed description of the apparatus for quenching of product stream will be given below.

The mixture of feedstock and steam-diluent from the apparatuses 2 and 3 is conveyed into the reactor 4. Hot process stream are circulated within the work annular cavity of the reactor, and the heat needed for pyrolysis is generated directly inside the volume of process stream due to hydrodynamic drag effect of rotating work wheel provided with the blades. Initial heating of the particles of feedstock up to pyrolysis temperature is performed by mixing them with the hot process stream for the negligible time in comparison with residence time. Detailed description of the reactor structure will be given below.

The product stream from the reactor 4 is conveyed into the quenching apparatuses 2 and 3 through interconnecting pipes having smooth shape to prevent formation of flow detachment zones. All these interconnecting pipes are equalized in volume.

The product stream is quenched in the apparatuses 2 and 3 and then transported into a gas fractionating installation (not shown in the drawings). In the FIG. 1 there are depicted two apparatuses for quenching of product stream, but the number of this apparatuses is not limited in the practical realization of the invention.

As a reactor drive the gas-turbine engine 5 is applied. Shown in FIG. 1 the gas-turbine engine works on a simple thermodynamic cycle has no intermediate heaters and coolers of the work fluid. As a drive there can be also used gas-turbine engines operating on more complex cycle, as well as steam turbine or electric motor.

The amount of steam being mixed with the hydrocarbon feed and tolerance final temperature depend on the composition of the feedstock. If a feedstock is an ordinary gaseous hydrocarbons, the amount of added steam should be to 30–40% in proportion to hydrocarbon mass, and the temperature of the inlet stream after second preheating should not exceed 650° C. If the ordinary liquid hydrocarbons—such as naphtha or gas oils—are used as a feedstock, the steam may be added in an amount of 80–100% in proportion to hydrocarbon mass, and relevant temperature of the inlet stream after the second preheating should not exceed 550–600° C.

The basic parameters defining operation of the reactor are interrelated by the following relationship:

$$\tau = V \times d \times H / P$$

where:

$\tau$ (sec) is the mean residence time of the process stream in the reactor;

V (m$^3$) is the volume of the reactor work cavity;

d (kg/m$^3$) is the mean density of the process stream within the reactor work cavity;

H (J/kg) is the energy transferred into the process stream within the reactor work cavity;

P (W) is the power transferred into the reactor work cavity.

The energy, which should be transferred into the process stream within the reactor work cavity, is close to the amount of heat transferred into process stream flowing through a radiant coil in conventional tubular pyrolysis furnaces operating with the same kind of feedstock. In pyrolysis of ethane this energy should be about 2.5–3.4 MJ per kg of feed/steam mixture. In pyrolysis of other kinds of hydrocarbon this energy should be about 1.7–2.3 MJ/kg.

The mean residence time of the process stream inside the reactor work cavity can be about 0.03–0.1 sec.

The period of time for heating the incoming feed/steam mixture from the temperature when entering into the reactor up to pyrolysis temperature is defined by the duration of mixing with the process stream being processed and does not exceed 0.001 sec. It is negligible short time in comparison with the residence time of the process stream within a work cavity of the reactor.

The mean density of the process stream is defined by average pressure, by average temperature in work cavity of the reactor and by average molecular mass of the process stream.

The average pressure within work cavity of the reactor can be set in the range 0.05–0.2 MPa (abs), preferably 0.08–0.12 MPa (abs).

The average the process stream temperature in the reactor work cavity depends on the feedstock composition, assigned conversion and residence time within work cavity. Light feedstock and high conversion require the higher temperatures, but heavy feedstock—as atmospheric and vacuum gas oils—and low conversion require lower temperatures.

The operator sets the temperature of the process stream in the work cavity of the reactor and the rates of hydrocarbon feed and water for preparing steam-diluent. The set temperature is maintained by automatic control system regulating a rate of fuel gas feeding the gas-turbine engine. Thence the temperature in the work cavity of the reactor is regulated as in principle as it is done in the conventional tubular furnace—by changing a rate of fuel gas in ratio to a rate of feedstock. A difference is that transient processes in the novel reactor are ended faster in 10–100 times.

To remove a coke from the reactor and the apparatuses for quenching of the product stream it is necessary to stop supply of hydrocarbon feed into the preheater 1. The temperature in the work cavity of the reactor must be maintained much the same as the temperature during pyrolysis. In the result of gasification reactions a superheated steam removes the coke deposits from the reactor 4 as well as from transfer tubes and apparatuses 2 and 3 for quenching of product stream. Outgoing flow is conveyed into afterburning installation (not shown in drawings). The process of decoking is checked by analysis of the output stream. When the contents of hydrogen, carbon oxide and carbon dioxide decreased down to beforehand assigned values, decoking is stopped and supply of hydrocarbon feed must be resumed. The advantage of such burning-out in comparison with air or air-steam burning-outs is endothermicity of the proceeding reactions eliminating a danger of local overheating construction materials. The another advantage is that reducing medium inside the reactor remains at all regimes of operation, enabling fabrication of the most important reactor elements of the heat-resistant alloys on base of heat-proof metals unstable under oxidizing conditions, for example of the alloys oil base of tungsten or molybdenum, or niobium.

In the present process the pyrolysis of feedstock proceeds in series in the work cavity, and further in transfer pipelines conveying the product stream to the quenching apparatuses. The hydrodynamic regime that is realized within the reactor work cavity is close to regime peculiar to apparatus of perfect mixing, where concentrations of reactants are homogeneous within this cavity. The process essentially differs by this from process realized in conventional tubular reactors and from the process disclosed by U.S. Pat. No. 4,265,732 as well.

Since the pyrolysis in the reactor work cavity proceeds in presence of just cracked products of high concentration, the pyrolysis reactions are accelerated due to autocatalysis phenomenon. Because of this the pyrolysis can be carried out also at lower temperature thus increasing the process selectivity. This is confirmed by experimental data on pyrolysis of hydrocarbons in presence of hot pyrolized gases, indicated in U.S. Pat. No. 3,579,601.

Inside transfer pipelines the pyrolysis proceeds adiabatically, without supply of heat from outside. The hydrodynamic regime realized here is close to regime peculiar to apparatus of perfect displacement as in tubular reactors. This adiabatic run enables to reduce energy expense for carrying out the pyrolysis process and to increase the olefin yields.

Figure 2:
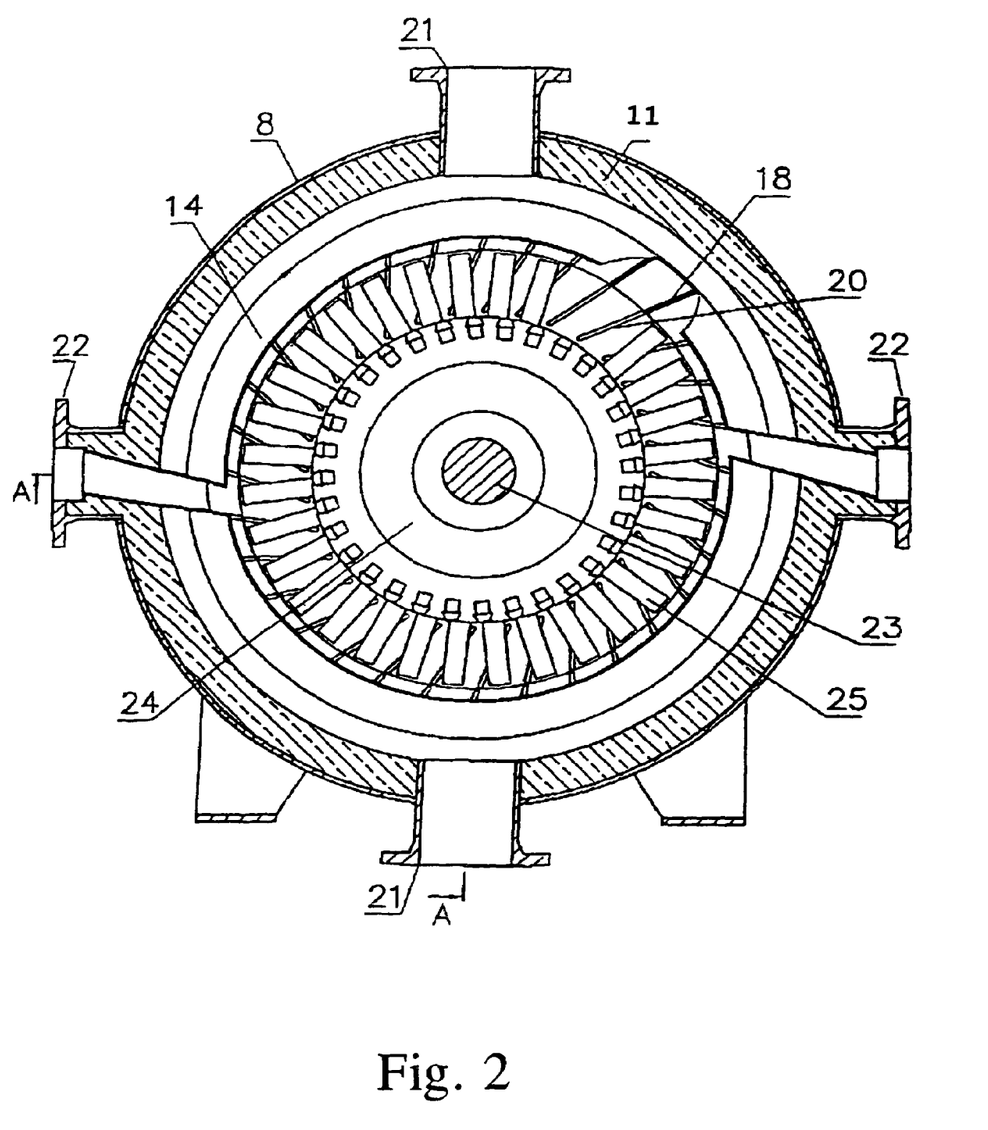
FIG. 2 is a sectional view of the reactor for use in the process for producing low-molecular olefins.
Figure 3:
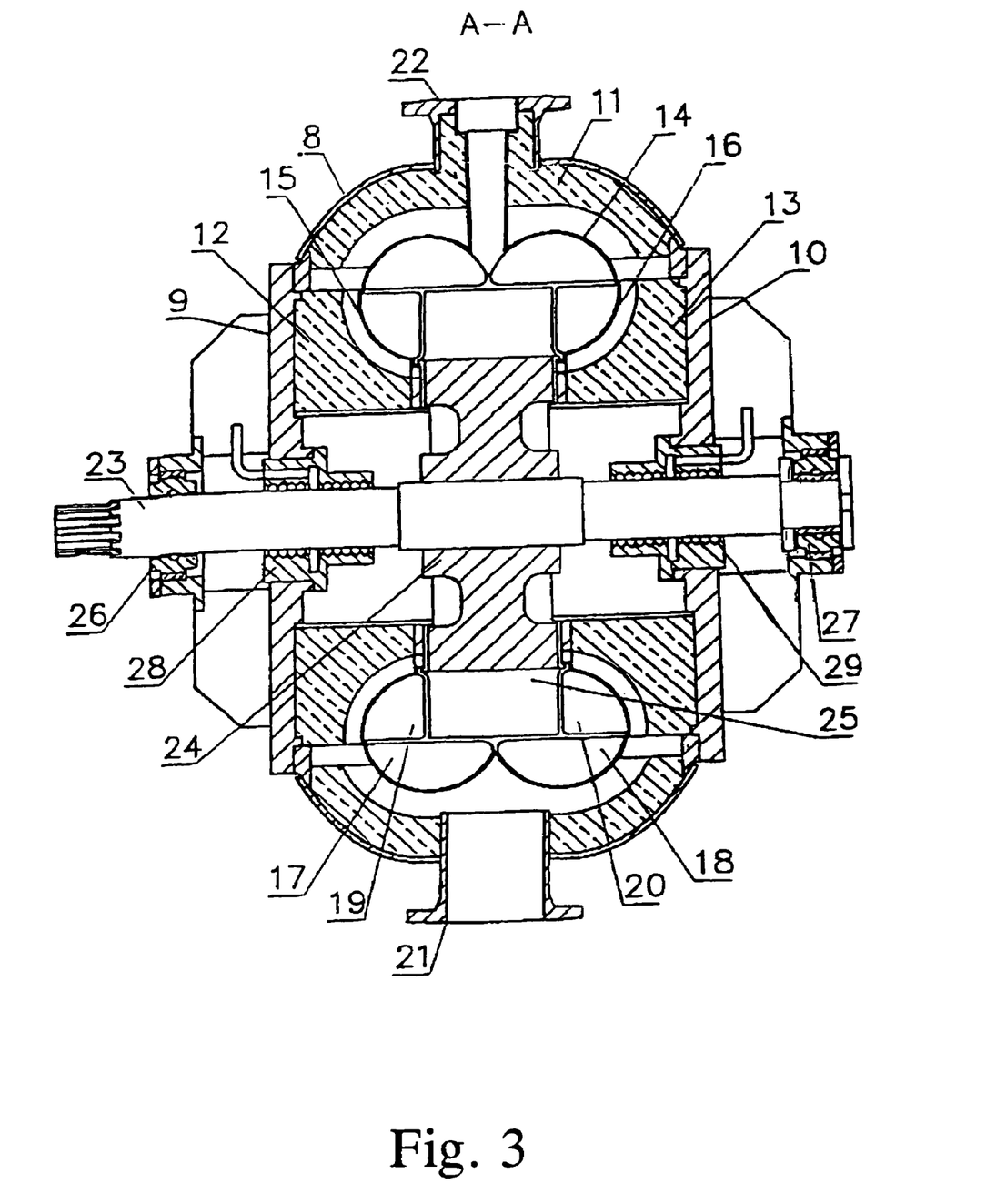
FIG. 3 is a cross-sectional view taken on line A—A in FIG. 2.

The reactor (FIGS. 2 and 3) for hydrocarbon pyrolysis comprises a housing including casing 8 with lids 9 and 10. Inner surfaces of the casing 8 and the lids 9, 10 are covered with heat insulators 11, 12 and 13. The housing comprises also a heat resistance skin formed by element 14 fastened together with the casing 8, and elements 15 and 16 fastened together with the lids 9 and 10. By means of the element 14 the directing blades 17 and 18 are fastened together. Directing blades 19 and 20 are fastened together with the elements 15 and 16. The casing 8 is provided with nipples 21 for inlet stream and nipples 22 for carrying off the product stream. A rotor consists of shaft 23 and work wheel 24 provided with work blades 25. The latter form the blading of the work wheel 24. The shaft 23 is supported by radial 26 and radial-thrust 27 bearings and is sealed up by double labyrinth packings 28 and 29 into channels of which a steam is injected from outside (not shown in the drawings).

Figure 4:
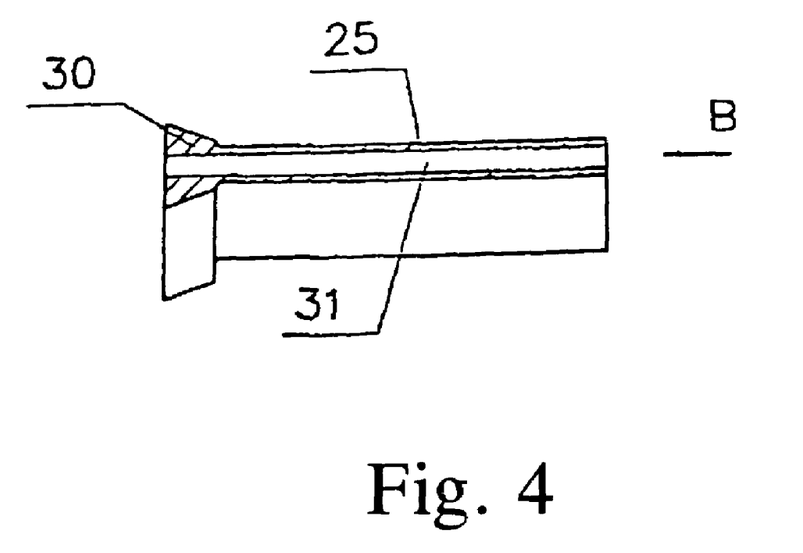
FIG. 4 is a sectional view of the radial work blade of the reactor.
Figure 5:
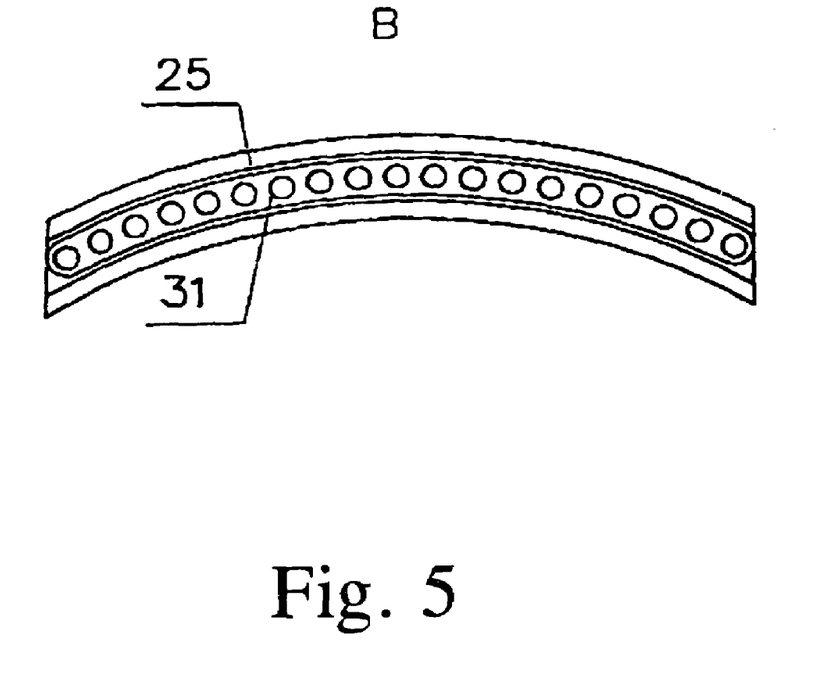
FIG. 5 is a view on the arrow B in FIG. 4.

Each work blade 25 (FIGS. 4 and 5) has a tail 30, by which they are fixed on a rim of the work wheel 24 forming a dovetail lock. In the blade 25 the radial channels 31 are made for passing an inlet stream used as a cooling agent.

The reactor operates in the following way. Through the inlet nipples 21 an inlet stream enters into a gap between the casing 8 and the heat resistant skin, passes further through the channels made in the work wheel 24 and in the work blades 25 and enters into the annular work cavity where the work blades 25 and the directing blades 17, 18, 19, 20 are arranged. The process stream being circulated within the annular cavity comes into multiple contacts in turn with the stationary directing blades and rotating work blades, thereby creating streamlines in the form of two spirals rolled up into vortex rings of right and left directions. Thus two communicating circuits of process stream circulation are created. Heat being absorbed by endothermic reactions, which continuously proceed within the reactor work cavity, is compensated by influx of heat arisen from converting kinetic energy into heat.

A power transferred into the said circuits is proportional to the rotor peripheral velocity and meridional velocity and density of the processed fluid. With increase of meridional velocity the power, dissipated by rotor, increases until this velocity reaches 0.64–0.7 sonic velocity in this fluid, i.e. about 400–500 m/s. At higher meridional velocities the power dissipated by rotor into the work cavity sharply decreases because of decrease of the fluid density averaged along a height of the blade. This is connected with a fact, that in the core of ring vortex the pressure is lower than on its periphery, and this pressure decrease depends on meridional velocity of the fluid.

During every passing through blading of a work wheel the reacting fluid acquires an additional kinetic energy, which for the time before next passing is converted into a heat. This occurs partly due to passing the fluid through stationary compression shocks arising in places of local transition of the fluid through sonic barrier, and partly due to vortex formation. The additional kinetic energy is proportional to the rotor peripheral velocity and meridional velocity of the fluid. For example, at the rotor peripheral velocity 300–400 m/s this energy can be about 70–150 kJ/kg. During the time of residence within the circuit every particle of feedstock should pass over the rotor work blades several tens times on average.

The advantage of the rotary blade reactor in comparison with conventional tubular reactors is that the boundary of the work cavity are not used for heat transfer, therefore, if a cooling is absent, the boundary temperature differs from the temperature of the process stream insignificantly. Lower boundary temperature and lower pressure in the work cavity in comparison with the same in conventional tubular reactors are reasons to expect increasing in the process selectivity and growth in desired product yields when processing the same kinds of feedstock. Short time of the installation starting and possibility of full automation of its operation and control contributes to increase in the desired product yields.

The apparatus for quenching of product stream (FIG. 6) includes a "tube-in-tube" heat exchanger comprising outer tube 32 and inner tube 33, inlet 34 and outlet 35 nipples for product stream, inlet 36 and outlet 37 nipples for conveying cooling agent communicated with intertubular space, and ejector comprising nozzle 38, an admission chamber 39 and a mixing chamber 40. The nozzle 38 is connected with the inlet nipple 34. The inner tube 33 is connected by one end with the mixing chamber 40 and by another end through the tee 41 with the admission chamber 39 and the product stream outlet nipple 35. Outer surfaces of the quenching apparatus are covered by heat insulator 42.

Figure 6:
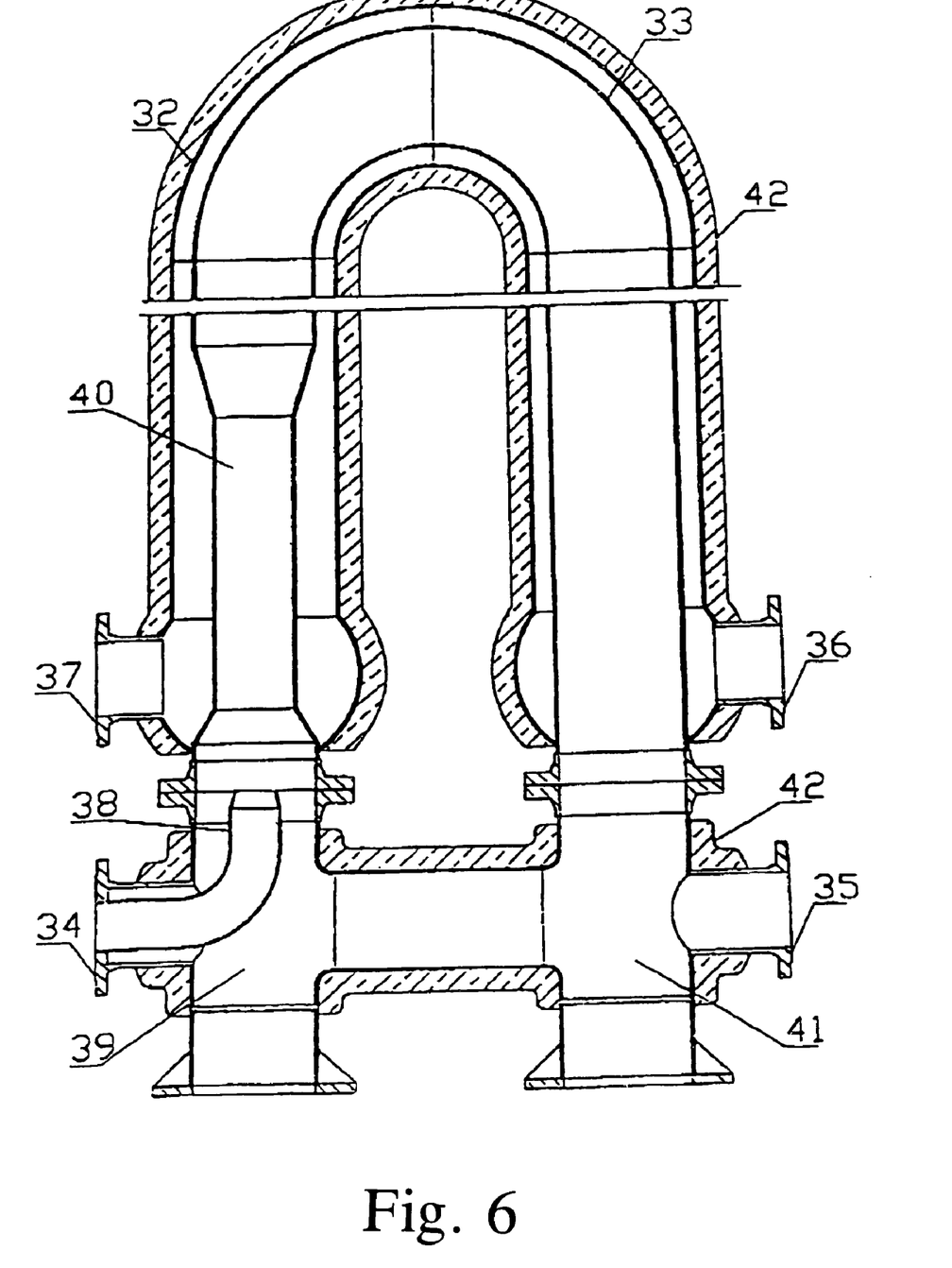
FIG. 6 is a sectional view of the apparatus for quenching of product stream in the process for producing low-molecular olefins.

Hot product stream entering through the nipple 34 passes into nozzle 38. Nozzle 38 forms a jet which sucks cooled gas from the admission chamber 39. The resulting mixture flowing through the inner tube 33 is cooled thus, giving back its heat to the fluid flowing through the intertubular space between the outer tube 32 and the inner tube 33 in direction from the nipple 36 to the nipple 37. A part of the cooled mixture enters into the admission chamber 39, and residual part is removed out of the apparatus through the nipple 35.

Outgoing from the nipple 35 cooled product stream can have the temperature from 350 to 400° C. Mass rate of the mixture in the inner tube exceeds about in 2–2.5 times the rate of the product stream coming from the reactor, and the mixture being formed in the mixing chamber 40 can have the temperature about 620–660° C.

Duration of the product stream quenching is defined only by the time of mixing the jet formed by the nozzle 38 with cooled gas from the mixing chamber 40 and can be of some milliseconds. Diameter of the inner tube 33 must be enough that it should not cause considerable pressure resistance.

A heat exchanger included in the apparatus for quenching of product stream can be of any other structure than "tube-in-tube" type. Small difference in pressure between heated and cooled fluids and low values of pressure enable to apply a plate heat exchanger or any others having lower both a mass and a cost in comparison with quenching apparatus usually used.

Commercial Applicability

Novel process for producing low-molecular olefins is intended for use instead conventional process of pyrolysis of hydrocarbons carried out in tubular furnaces. The present invention can be applied as in building of new ethylene plants and in modernization of existing ethylene plants as well.

Calculations show that in installation based on rotary blade reactor driven by gas-turbine engine of 10 . . . 16 MW power a capacity on processed feedstock (naphtha) will be 14 . . . 22 t/h that corresponds to capacity of existing tubular pyrolysis furnaces of mean capacity.

It is expediently to use gas-turbine engines of simple cycle applied at present in gas-turbine power stations and gas pumping stations of arterial gas pipelines. Full durability of such engines is usually 100,000 hours. Coefficient of efficiency of these engines is about 34 . . . 38% and exhaust gas temperature is about 440 . . . 520° C. High temperature of exhaust gas enables to use effectively its heat for preparation and preheating of feedstock-steam mixture and superheating of a steam for use in process needs. As fuel a natural gas or methane-hydrogen fraction separated from product stream in gas-fractionating installation can be used.

Consumption of fuel gas per 1 ton of processed feedstock will not be greater than in tubular pyrolysis furnaces. Concentration of $NO_x$ in exhaust gases of stationary gas-turbine engines at present is of about 35 . . . 50 ppm that approximately 10 times less than concentrations NO, in smoke-gases of tubular furnaces. The stationary gas-turbine engine with NO, emission of 6 ppm is already developed. So application of installations on base of rotary blade reactor enables essential improvement of ecological compatibility of ethylene plants.

It can be expected that more advantageous process conditions realized in rotary blade reactor in comparison with tubular furnace provide reduction in hydrocarbon feedstock consumption in low-molecular olefins production. Since pyrolysis installation on base of rotary blade reactor can be assembled on site of full readiness blocks delivered on place of construction by respective producers it should be expected that period and cost of construction will be in 2 . . . 3 times less in comparison with period and cost of construction for tubular furnace of similar capacity.

I claim:

1. A process for producing low-molecular olefins by thermal pyrolysis of hydrocarbons said process comprises steps:
   a) preparation of evaporated feedstock steam mixture,
   b) preheating the resulting mixture
   c) heating said mixture up to pyrolysis temperature,
   d) a supply with a heat, which is necessary for pyrolysis, into the process stream,
   e) quenching a product stream, and
   f) fractionation of the product stream, wherein
   in the step a) amount of added steam-diluent per mass of hydrocarbon feedstock does not exceed the limits accepted in existing pyrolysis plants,
   steps c) and d) are performed in a reactor, comprising: a hollow housing having a nipple for inlet stream, and a nipple for outlet stream, and stationary blades;
   a rotatable wheel with a work blades is positioned in said housing so that said wheel with said housing together form an annular work cavity,
   said cavity is formed so and said stationary blades and work blades are positioned in said cavity and are shaped to create a ring vortex flow in said cavity when said wheel is rotated, and
   said nipple for inlet stream and said nipple for outlet stream are communicated with said work cavity,
   step c) is performed by mixing of said mixture with hot process stream being circulated in said work cavity, for a negligible time in comparison with the residence time,
   step d) is performed by using heat, generated directly in the process stream in result of hydrodynamic drag of said rotated work blades.

2. The process of claim 1, wherein a gas-turbine engine is used as a drive of said reactor, and step b) is performed in two stages, and first stage of said preheating is carried out in first heat exchanger utilizing heat of exhaust gases of said gas-turbine engine, and
   second stage of said preheating is carried out in second heat exchanger utilizing heat of hot product stream outgoing from said reactor.

* * * * *